United States Patent
Lee et al.

(10) Patent No.: US 10,598,278 B2
(45) Date of Patent: Mar. 24, 2020

(54) METHOD FOR MAINTAINING IDLE NOISE REFINEMENT AND VEHICLE THEREOF

(71) Applicants: HYUNDAI MOTOR COMPANY, Seoul (KR); KIA MOTORS CORPORATION, Seoul (KR)

(72) Inventors: Dong-Chul Lee, Anyang-si (KR); In-Soo Jung, Suwon-si (KR)

(73) Assignees: Hyundai Motors Company, Seoul (KR); Kia Motors Corporation, Seoul (KR)

( * ) Notice: Subject to any disclaimer, the term of this patent is extended or adjusted under 35 U.S.C. 154(b) by 189 days.

(21) Appl. No.: 15/838,757

(22) Filed: Dec. 12, 2017

(65) Prior Publication Data

US 2019/0093762 A1  Mar. 28, 2019

(30) Foreign Application Priority Data

Sep. 26, 2017  (KR) .......................... 10-2017-0123948

(51) Int. Cl.
| | | |
|---|---|---|
| *F02N 11/08* | (2006.01) | |
| *F02D 41/00* | (2006.01) | |
| *F16H 61/04* | (2006.01) | |
| *F16H 61/20* | (2006.01) | |
| *F16H 61/02* | (2006.01) | |

(52) U.S. Cl.
CPC ....... *F16H 61/20* (2013.01); *F16H 2061/207* (2013.01); *F16H 2312/02* (2013.01); *F16H 2312/06* (2013.01)

(58) Field of Classification Search
CPC ............. F02N 11/0818; F02D 41/0225; F16H 2061/0488; F16H 2061/0481; F16H 2061/207; F16H 2312/02
See application file for complete search history.

(56) References Cited

U.S. PATENT DOCUMENTS

| | | | | |
|---|---|---|---|---|
| 5,052,531 A | * | 10/1991 | Bota ...................... | B60T 7/122 |
| | | | | 192/219.1 |
| 5,630,772 A | * | 5/1997 | Tsukamoto ............. | F16H 61/20 |
| | | | | 475/120 |
| 5,911,646 A | * | 6/1999 | Tsutsui ................... | B60T 7/122 |
| | | | | 192/13 A |
| 6,039,673 A | * | 3/2000 | Mikami .............. | F16H 61/0206 |
| | | | | 477/93 |
| 6,843,754 B2 | * | 1/2005 | Mori ...................... | F16H 61/20 |
| | | | | 475/120 |
| 6,926,639 B2 | | 8/2005 | Hopper | |
| 9,382,859 B2 | | 7/2016 | Funakoshi et al. | |
| 2008/0125944 A1 | | 5/2008 | Kamishima et al. | |

FOREIGN PATENT DOCUMENTS

| | | |
|---|---|---|
| JP | 2003002087 A | 1/2003 |
| KR | 101714307 B1 | 3/2017 |

* cited by examiner

*Primary Examiner* — Tisha D Lewis
(74) *Attorney, Agent, or Firm* — Brinks Gilson & Lione

(57) ABSTRACT

A method for maintaining idle noise refinement in a vehicle is provided. The method may include performing a D-range neutral control, wherein a controller is configured to apply auto hold threshold values to conditions for entering an auto hold control in a neutral control state, and wherein the auto hold threshold values are determinant of an entry into the D-range neutral control such that the auto hold threshold values limit the conditions for entering the auto hold control.

19 Claims, 4 Drawing Sheets

METHOD FOR MAINTAINING IDLE NOISE REFINEMENT AND VEHICLE THEREOF

CROSS-REFERENCE TO RELATED APPLICATIONS

This application claims priority to and the benefit of Korean Patent Application No. 10-2017-0123948, filed on Sep. 26, 2017, which is incorporated herein by reference in its entirety.

FIELD

Exemplary forms of the present disclosure relate to control of Noise, Vibration, and Harshness (NVH) during idle; and, particularly, to a vehicle to which a method for maintaining idle noise refinement through D-range neutral control is applied.

BACKGROUND

The statements in this section merely provide background information related to the present disclosure and may not constitute prior art.

In general, D-range neutral control logic and auto hold logic, applied to an automatic transmission vehicle in order to improve the marketability thereof, have different functions. Here, logic means a mode or a method. Also, idle NVH in D-range and idle NVH in N-range represent idle noise.

D-range neutral control logic may greatly improve the marketability of a vehicle with regard to NVH by refining idle NVH in an automatic transmission vehicle, in which NVH during idle in D-range is more severe than NVH during idle in N-range.

This is because D-range requires the increase of a load on an engine due to direct engagement to the torque converter of an automatic transmission, which increases fuel consumption, but N-range prevents the load of the torque converter of the automatic transmission from being applied, which decreases fuel consumption. Accordingly, when conditions for neutral control are satisfied in D-range, an N-range idle state, in which less fuel is consumed compared to a D-range idle state, is used, whereby a refined idle NVH level in N-range may be realized also in D-range.

Auto hold logic maintains an idle state even when a driver takes his or her foot off a brake pedal during idle in D-range. Accordingly, auto hold logic may reduce driver's fatigue whereby the driver does not have to keep his or her foot on a brake pedal when frequently entering an idle state while driving in urban areas, thereby improving driver's convenience.

Therefore, an automatic transmission vehicle may improve marketability with regard to idle NVH by performing D-range neutral control when entering an idle state, and may also improve driver's convenience through auto hold logic when entering an idle state.

However, because both D-range neutral control logic and auto hold logic use a brake pedal effort (i.e. a pedal stroke) as the common factor of idle control, auto hold control may intervene in D-range neutral control, which may cause the effect of idle NVH refinement, achieved through D-range neutral control, to change.

For example, when a driver does not manipulate a brake according to an auto hold condition, this is recognized as dissatisfying a condition for D-range neutral control, which cancels D-range neutral control. As a result, a driver feels that NVH is refined when D-range neutral control is performed during idle, but feels that NVH is deteriorated when auto hold control is performed during idle. Such a change of NVH during idle may result in customer complaints about the vehicle.

SUMMARY

The present disclosure provides a method for maintaining idle noise refinement and a vehicle to which the method is applied, in which when entering an idle state through D-range neutral control, a threshold value is applied to an auto hold entry condition.

The present disclosure includes D-range neutral control in which, when an engine of a vehicle is operating based on Idle Stop & Go (ISG) control, a controller applies auto hold threshold values to conditions for entering auto hold control in a neutral control state and in which the auto hold threshold values limit the conditions for entering auto hold control by being set as a determinant of entry into D-range neutral control.

In one form of the present disclosure, the D-range neutral control may include: determining whether an auto hold function is activated based on whether a transmission is in a D-range idle slip state in the neutral control state, when it is determined that the auto hold function is not activated, sensing a vehicle speed, an engine coolant temperature, and a brake pedal effort as the determinant of the entry into the D-range neutral control, and when D-range set conditions of the vehicle speed, the engine coolant temperature, and the brake pedal effort are satisfied, entering the D-range idle slip state, determining whether the engine operates based on the ISG control in the D-range idle slip state when it is determined that the auto hold function is activated, applying the auto hold threshold values for the vehicle speed, the engine coolant temperature, and the brake pedal effort when it is determined that the engine operates, and maintaining the D-range idle slip state when conditions for maintaining D-range neutral control are satisfied.

The D-range set condition of the vehicle speed may be a predetermined vehicle speed threshold value, which is set to 0 kph, and the D range set condition may be determined to be satisfied when the vehicle speed is equal to the vehicle speed threshold value. The D-range set condition of the engine coolant temperature may be a predetermined engine coolant temperature threshold value, and the D-range set condition may be determined to be satisfied when the engine coolant temperature is higher than the engine coolant temperature threshold value. The D-range set condition of the brake pedal effort may be a predetermined brake pedal effort threshold value, and the D-range set condition may be determined to be satisfied when the brake pedal effort is greater than the brake pedal effort threshold value.

Entering the D-range idle slip state may be delayed for a predetermined amount of time.

The conditions for maintaining the D-range neutral control may be divided into a D-range idle state maintenance condition of the vehicle speed and the engine coolant temperature and an auto hold entry restriction condition of the brake pedal effort, and the D-range idle state maintenance condition and the auto hold entry restriction condition may be selectively applied.

The D-range idle state maintenance condition of the vehicle speed may be a predetermined auto hold vehicle speed threshold value, the D-range idle state maintenance condition of the engine coolant temperature may be a predetermined auto hold engine coolant temperature threshold value, and the auto hold entry restriction condition of the brake pedal effort may be a predetermined auto hold brake pedal effort threshold value. When the vehicle speed is equal to the auto hold vehicle speed threshold value and when the engine coolant temperature is higher than the auto hold engine coolant temperature threshold value, the D-range idle state maintenance condition may be determined to be satisfied, and when the brake pedal effort is greater than the auto hold brake pedal effort threshold value, the auto hold entry restriction condition may be determined to be satisfied.

In the neutral control state, the controller may apply N-range neutral control when the D-range neutral control is not applied, and the neutral control state of the vehicle may be determined depending on whether a gear position signal is a D signal or an N signal. The determinant of entry into D-range neutral control may be sensed when the gear position signal is a D signal.

In another form of the present disclosure, a vehicle may include an engine configured to idle or turn off based on Idle Stop & Go (ISG) control, and to enable a D-range idle state through an auto hold control; a transmission configured to enter a D-range idle slip state through a D-range neutral control; and a controller configured to receive signals, sensed by a sensor installed in the vehicle, as input data, to apply threshold values for a vehicle speed, an engine coolant temperature, and a brake pedal effort in a state when the engine is in an idle state, and to apply the threshold values for operation of auto hold control that is configured to interrupt the D-range neutral control.

The controller may be connected to a D-range neutral control map and an auto hold map. and process P, N, D and R signals indicating a gear position, a vehicle speed, an engine coolant temperature, a brake pedal effort signal, and ISG ON/OFF signals as input data. The D-range neutral control map may be configured to perform the D-range neutral control in response to a D-range idle control signal, and the auto hold map may be configured to perform the auto hold control in response to an auto hold control signal.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
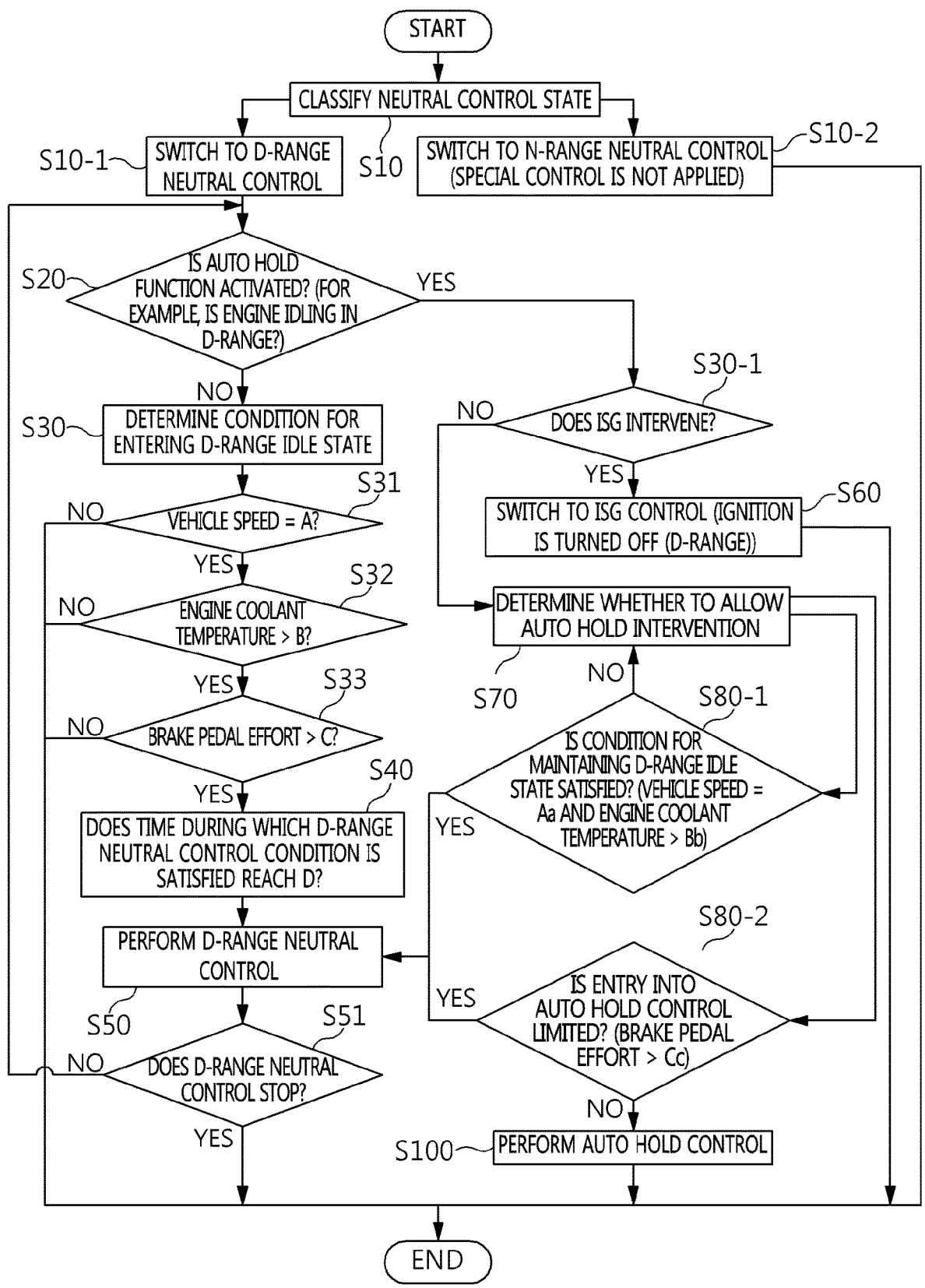
FIG. 1 is a flowchart of a method for maintaining idle noise refinement.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Some forms of the present disclosure will be described below in more detail with reference to the accompanying drawings so as to be easily realized by those skilled in the art. The present disclosure may, however, be embodied in different forms and should not be construed as limited to the forms set forth herein.

Referring to FIG. 1, in the method for maintaining idle noise refinement, D-range neutral control (S10-1) is separate from N-range neutral control (S10-2) as the result of classifying a neutral control state (S10). Here, performing D-range neutral control (S30 to S51) limits conditions for interrupting D-range neutral control using auto hold entry threshold values, which are set in order to determine whether to perform auto hold control, whereby an existing D-range neutral control mode is extended to a D-range auto hold neutral control mode. That is, the D-range auto hold neutral control mode may provide improved D-range neutral control.

Particularly, after entering a D-range idle state, the D-range auto hold neutral control mode maintains the D-range idle state (S50) by selectively applying a threshold value for brake pedal effort (S80-2) and threshold values for a vehicle speed and an engine coolant temperature (S80-1), which are conditions for entering D-range neutral control, thereby overcoming the disadvantage of the existing D-range neutral control mode, in which merely releasing the manipulation of a brake pedal results in the cancellation of the D-range idle state and the immediate start of auto hold control.

Figure 2:
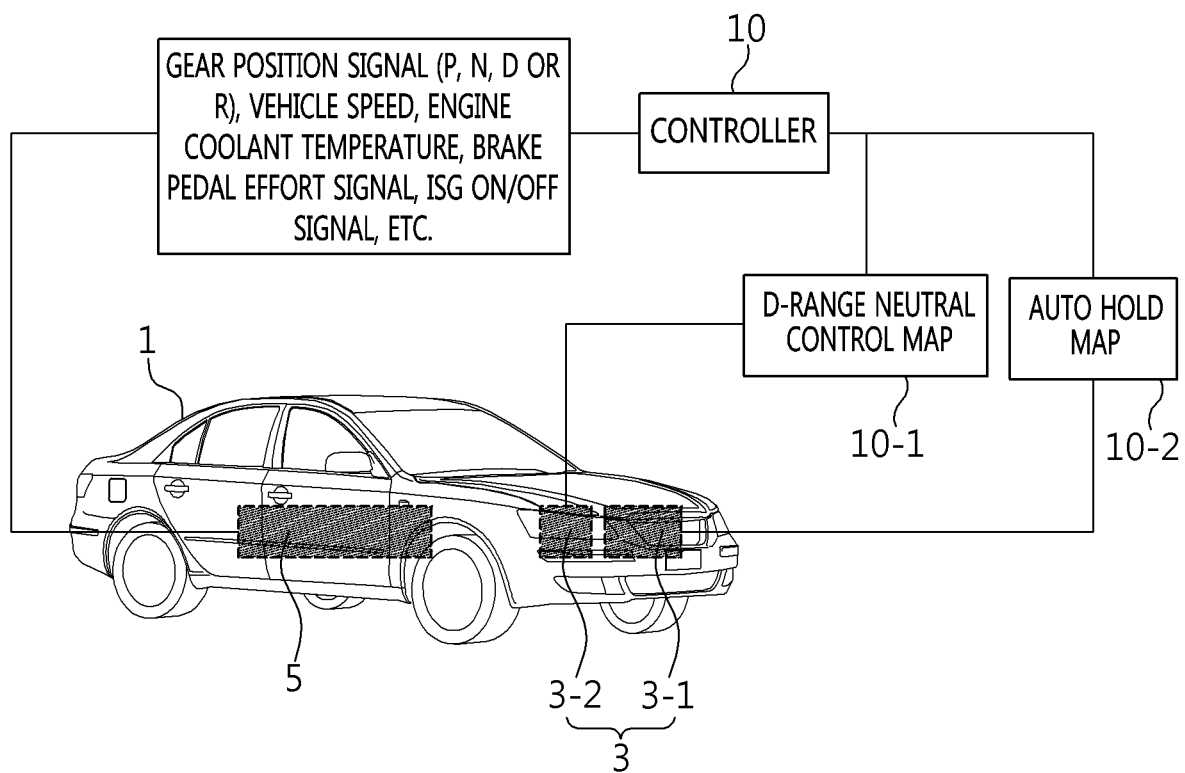
FIG. 2 shows an example of a vehicle to which a method for maintaining idle noise refinement is applied.

Referring to FIG. 2, a vehicle 1 includes a power train 3, a sensor 5 installed in the vehicle, and a controller 10.

For example, the power train 3 is configured with an engine 3-1 and an automatic transmission 3-2 equipped with a torque converter, and may be regarded as an engine and a transmission of general vehicles. The sensor 5 is a sensor installed in order to detect the driving state of the vehicle 1. The sensor 5 detects a gear position signal (P, N, D or R), a vehicle speed, an engine coolant temperature, a brake pedal effort signal, an Idle Stop & Go (ISG) ON/OFF signal, and the like, and provides the detected information to the controller 10. That is, the sensor 5 is a sensor installed in general vehicles.

For example, the controller 10 processes a gear position signal (P, N, D or R), a vehicle speed, an engine coolant temperature, a brake pedal effort signal, an ISG ON/OFF signal, and the like, which are sensed by the sensor 5, as input data and outputs a D-range neutral control signal or an auto hold control signal by associating the signal processing result with a D-range neutral control map 10-1 or an auto hold map 10-2. The D-range neutral control map 10-1, having a table about a vehicle speed, an engine coolant temperature, and a brake pedal effort, provides determination of whether to maintain D-range neutral control, and the auto hold map 10-2, having a table about information about an ISG ON/OFF state, a vehicle speed, an engine coolant temperature, and a brake pedal effort, provides determination of whether to maintain D-range neutral control and determination whether to start auto hold control. Here, the controller 10, the D-range neutral control map 10-1, and the auto hold map 10-2 may be separately installed in the vehicle 1, or may be integrated into an Electronic Control unit (ECU) of the engine and installed in the vehicle 1.

Hereinafter, the method for maintaining idle noise refinement in FIG. 1 will be described in detail with reference to FIGS. 2 to 4. Here, the entity that performs control is the controller 10, which is connected to the sensor 5, the D-range neutral control map 10-1, and the auto hold map 10-2, and the targets to be controlled are the engine 3-1 and the transmission 3-2 of the power train 3.

First, at the step of determining the neutral control state of a vehicle (S10), the controller 10 separates D-range neutral control (S10-1) from N-range neutral control (S10-2). Here, the neutral control state of the vehicle is determined based on whether the gear position signal (i.e. P, N, D or R) is D or N.

Referring to FIG. 2, after the neutral control state is determined at step S10 depending on the gear position signal (P, N, D or R) of the sensor 5, the controller 10 performs D-range neutral control at step S10-1 when the gear position signal is a D signal, but performs N-range neutral control at step S10-2 when the gear position signal is an N signal. In the case of N-range neutral control, neutral control is performed without applying special control and is then terminated. However, in the case of D-range neutral control, neutral control based on whether auto hold control intervenes therein is performed and is then terminated. This is because during idle in N-range, the load of the torque converter of the auto transmission is not applied and fuel consumption decreases, but during idle in D-range, the increase of an engine load is required due to the direct engagement to the torque converter.

Subsequently, the controller 10 is switched to a D-range neutral control state.

The controller 10 determines at step S20 whether an auto hold function is activated depending on whether the engine 3-1 is idling in D-range. When the engine is in a D-range idle state, the controller 10 determines at step S30-1 whether ISG is turned on, but when the engine is not in the D-range idle state, the controller 10 determines at step S30 whether conditions for entering the D-range idle state are satisfied. Accordingly, whether to perform auto hold control may not be determined before performing D-range neutral control at step S50.

Specifically, when it is determined at step S20 that the auto hold function is not activated, conditions for entering a D-range idle state are checked at step S30, and the checking process is divided into applying a vehicle speed at step S31, applying an engine coolant temperature at step S32, applying a brake pedal effort at step S33, and applying D-range neutral control time at step S34. In this case, the vehicle speed, the engine coolant temperature, and the brake pedal effort are applied as determinants of D-range neutral control and are compared with threshold values.

Figure 3:
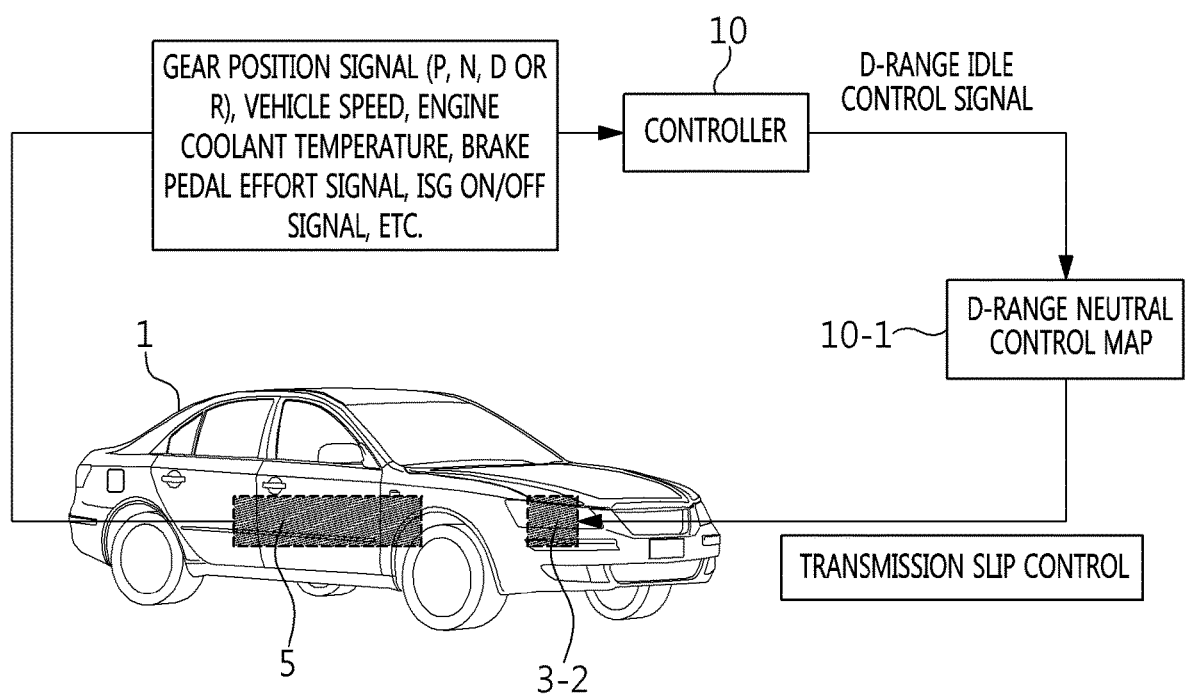
FIG. 3 shows a D-range neutral control state of a vehicle.

Referring to FIG. 3, the controller 10 reads a vehicle speed from the sensor 5 and applies it to the following vehicle state determination equation at the step of applying the vehicle speed (S31), reads an engine coolant temperature from the sensor 5 and applies it to the following engine state determination equation at the step of applying the engine coolant temperature (S32), and reads a brake pedal effort signal from the sensor 5 and applies it to the following stop determination equation at the step of applying the brake pedal effort (S33).

vehicle state determination equation: vehicle speed=A engine state determination equation: engine coolant temperature>B stop determination equation: brake pedal effort>C control waiting determination equation: time satisfying D-range neutral control=D Here, "=" and ">" are signs for representing the relationship between the magnitudes of two values. "A" is a vehicle speed threshold value for determining a D-range idle state and is set to 0 kph. "B" is an engine coolant temperature threshold value for determining the D-range idle state and is set to 60° C. "C" is a brake pedal effort threshold value for determining the D-range idle state and is set to 90%. Here, the vehicle speed, the engine coolant temperature, and the brake pedal effort are values sensed when conditions for entering the D-range idle state are checked, and "D" is set to about 5 seconds as predetermined amount of time. Here, the predetermined values and the predetermined amount of time vary depending on the specifications of the engine, and are not limited to specific values, but for example, the values of A, B, C and D may be set to 0 kph, 60° C., 90%, and 5 seconds, respectively.

Accordingly, when the vehicle speed is greater than the predetermined value 'A', when the engine coolant temperature is less than the predetermined value 'B', or when the brake pedal effort is less than the predetermined value 'C', D-range neutral control is terminated. Conversely, when the vehicle speed equals to the predetermined value 'A', when the engine coolant temperature is higher than the predetermined value 'B', and when the brake pedal effort is equal to or greater than the predetermined value 'C', the controller 10 outputs a D-range idle control signal to the D-range neutral control map 10-1.

Subsequently, the controller 10 performs D-range neutral control at step S50 when the predetermined amount of time 'D' elapses after the D-range idle control signal is output, and determines at step S51 whether to stop D-range neutral control. When it is determined to stop D-range neutral control, D-range neutral control is terminated, but when it is determined to continue D-range neutral control, the process goes back to step S20, and whether an auto hold function is activated is continuously checked.

Accordingly, when the predetermined amount of time 'D' elapses in the state in which the vehicle speed, the engine coolant temperature, and the brake pedal effort satisfy the conditions, the controller 10 performs D-range neutral control, whereby D-range NVH performance control is performed under the torque converter load condition that is similar to that in N-range through the slip of the transmission 3-2 under a D-range idle condition. Here, D-range NVH performance control presents idle NVH performance similar to that in N-range, whereby marketability with regard to NVH may be improved.

Specifically, when it is determined at step S20 that the auto hold function is activated, whether ISG intervenes is determined at step S30-1. Here, when the engine 3-1 is turned off by ISG, the process is switched to ISG control at step S60 and D-range neutral control is interrupted, but when ISG is not operating, the process is switched to determining whether to allow auto hold intervention at step S70.

Here, determining whether to allow auto hold intervention at step S70 is divided into determining whether conditions for maintaining a D-range idle state are satisfied (S80-1) and determining whether conditions for entering auto hold control are satisfied (S80-2). Depending on whether conditions for maintaining the D-range idle state are satisfied (S80-1), the process goes back to determining whether to allow auto hold intervention at step S70, or D-range neutral control is performed at step S50. Also, depending on whether conditions for entering auto hold control are satisfied (S80-2), D-range neutral control is performed at step S50, or auto hold control is performed at step S100 in which case D-range neutral control is terminated. Here, when whether conditions for maintaining the D-range idle state are satisfied is determined, the vehicle speed and the engine coolant temperature are applied, and when whether conditions for entering auto hold control are satisfied is determined, the brake pedal effort is applied. Here, the following D-range neutral control maintenance determination equation and the following auto hold intervention equation are selectively applied.

Figure 4:
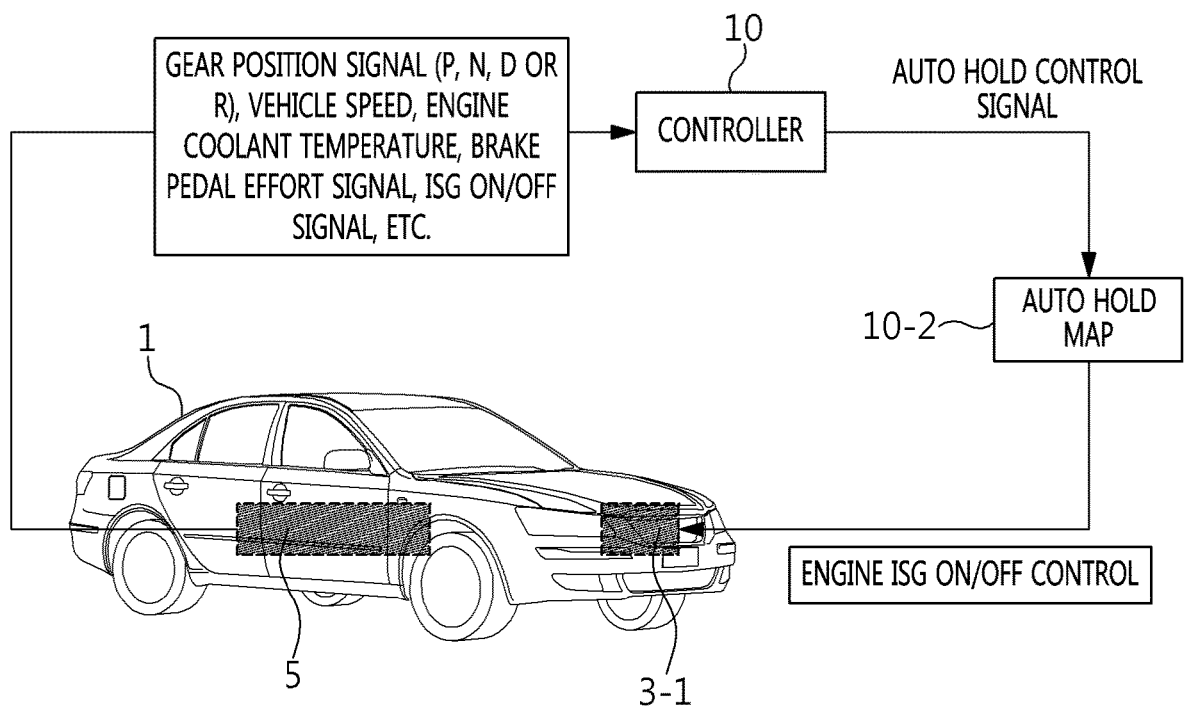
FIG. 4 shows an auto hold control state of a vehicle.

Referring to FIG. 4, in response to an ISG OFF signal from the sensor 5, the controller 10 determines at step S30-1 that ISG intervenes and switches the process to ISG control logic at step S60, thereby terminating D-range neutral control. Conversely, in response to an ISG ON signal from the sensor 5, the controller 10 determines whether to allow auto hold intervention at step S70. Then, when whether to allow auto hold intervention is determined, the controller 10 reads a vehicle speed, an engine coolant temperature, and a brake pedal effort signal from the sensor 5, applies the vehicle speed and the engine coolant temperature to determination of whether conditions for maintaining the D-range idle state are satisfied at step S80-1, and applies the brake pedal effort to determination whether conditions for entering auto hold control are satisfied at step S80-2.

Accordingly, the controller 10 applies the vehicle speed and the engine coolant temperature to the D-range neutral control maintenance determination equation and applies the brake pedal effort to the auto hold intervention equation.

D-range neutral control maintenance determination equation: vehicle speed=Aa and engine coolant temperature>Bb Auto hold intervention equation: brake pedal effort>Cc Here, "Aa" is a vehicle speed threshold value for auto hold and uses a predetermined value, "Bb" is an engine coolant temperature threshold value for auto hold and uses a predetermined value, and "Cc" is a brake pedal effort threshold value for auto hold and uses a predetermined value. Here, the vehicle speed and the engine coolant temperature are sensed when whether conditions for maintaining D-range neutral control are satisfied is determined, and the brake pedal effort is sensed when whether to allow auto hold intervention is determined. Here, the vehicle speed threshold value for auto hold is equal to the vehicle speed threshold value for determining the D-range idle state, and the engine coolant temperature threshold value for auto hold is equal to the engine coolant temperature threshold value for determining the D-range idle state. However, the brake pedal effort threshold value for auto hold is not equal to that for determining the D-range idle state.

The predetermined values vary depending on the specifications of the engine, and are not limited to specific values, but for example, Aa, Bb and Cc may be set to 0 kph, 60° C., and 90%, respectively.

Accordingly, when the vehicle speed is equal to the predetermined value 'Aa' and the engine coolant temperature is higher than the predetermined value 'Bb', or when the brake pedal effort is not equal to the predetermined value 'Cc', the controller 10 continuously outputs the D-range idle control signal to the D-range neutral control map 10-1, thereby maintaining D-range neutral control at step S50. Conversely, when the vehicle speed is greater than the predetermined value 'Aa' and the engine coolant temperature is lower than the predetermined value 'Bb', the process goes back to step S70 in order determine whether to allow auto hold prevention. Also, when the brake pedal effort is greater than 0%, the controller 10 outputs the D-range idle control signal to the D-range neutral control map 10-1, thereby maintaining D-range neutral control at step S50. Conversely, when the brake pedal effort is equal to the predetermined value 'Cc', the controller 10 outputs the auto hold control signal to the auto hold map 10-2, whereby D-range neutral control at step S50 is terminated and auto hold control is performed at step S100.

As described above, in order to determine whether to switch to auto hold control, which interrupts D-range neutral control that is being performed, the controller 10 selectively applies threshold values for maintaining a D-range idle state, which are to be compared with the vehicle speed and the engine coolant temperature, and a threshold value for entering auto hold logic, which is to be compared with the brake pedal effort, thereby limiting the switch to auto hold control.

As described above, the method for maintaining idle noise refinement in a vehicle in some forms of the present disclosure, when D-range neutral control for D-range idle slip control of the transmission 3-2 is performed, the controller 10 applies threshold values for the vehicle speed and the engine coolant temperature and a threshold value for a brake pedal effort in the state in which the engine 3-1 is operating, and performs auto hold control depending on the result of selective application of the threshold values, whereby auto hold control, which used to be initiated by merely releasing the manipulation of a brake by a driver in the D-range neutral control state, is limited. Accordingly, even if both auto hold control and D-range neutral control are implemented in the vehicle 1, D-range neutral control may be maintained, whereby idle NVH in D-range may be prevented from being deteriorated.

The above described vehicle in some forms the present disclosure has the following operations and effects by implementing control for maintaining idle noise refinement when entering D-range neutral control.

First, the present disclosure may contribute to the marketability of a vehicle with regard to idle NVH by maintaining idle noise refinement through D-range neutral control depending on the determination of an auto hold entry condition. Also, the present disclosure does not adversely affect existing idle stability because opportunities for entering D-range neutral control are expanded. Additionally, the present disclosure enables a vehicle to be accelerated immediately when pressure is applied on an accelerator pedal, whereby power performance is not reduced compared to auto hold and ISG in which taking a foot off a brake pedal and applying pressure on an accelerator pedal are recognized as conditions for restarting and acceleration. Moreover, in some forms of the present disclosure, D-range neutral control, which may reduce the emission of exhaust gas in real-world driving, is dominant to auto hold control because entering auto hold control is limited depending on conditions to which D-range neutral control logic is applied. Finally, the present disclosure may be cost- effective because the application of logic may be achieved without adding or changing hardware and existing idle neutral control logic may be maintained.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for maintaining an idle noise refinement, the method comprising:
performing a D-range neutral control,
wherein a controller is configured to apply auto hold threshold values to conditions for entering an auto hold control in a neutral control state,
wherein the auto hold threshold values are determinant of an entry into the D-range neutral control such that the auto hold threshold values limit the conditions for entering the auto hold control, and wherein performing the D-range neutral control further comprises:
determining whether an auto hold function is activated based on whether a transmission is in a D-range idle slip state in the neutral control state;
when it is determined that the auto hold function is not activated, sensing a vehicle speed, an engine coolant temperature, and a brake pedal effort as the determinant of the entry into the D-range neutral control;
when D-range set conditions of the vehicle speed, the engine coolant temperature, and the brake pedal effort are satisfied, entering the D-range idle slip state;
when it is determined that the auto hold function is activated, determining whether the engine operates based on an Idle Stop and Go (ISG) control in the D-range idle slip state;
when it is determined that the engine operates, applying the auto hold threshold values for the vehicle speed, the engine coolant temperature, and the brake pedal effort; and
when conditions for maintaining the D-range neutral control are satisfied, maintaining the D-range idle slip state.

2. The method of claim 1, wherein the method further comprises:
performing the D-range neutral control when an engine operates based on the ISG control.

3. The method of claim 1, wherein the method further comprises:
determining the neutral control state of the vehicle based on whether a gear position signal is a D signal or a N signal; and
when the gear position signal is the D signal, sensing the determinant of the entry into the D-range neutral control.

4. The method of claim 1, wherein the method further comprises:
when the vehicle speed is equal to a vehicle speed threshold value, determining that the D-range set condition is satisfied, wherein the vehicle speed threshold value is the D-range set condition of the vehicle speed.

5. The method of claim 4, wherein the vehicle speed threshold value is a predetermined value.

6. The method of claim 1, wherein the method further comprises:
when the engine coolant temperature is higher than an engine coolant temperature threshold value, determining that the D-range set condition is satisfied, wherein the engine coolant temperature threshold value is the D-range set condition of the engine coolant temperature.

7. The method of claim 6, wherein the engine coolant temperature threshold value is a predetermined value.

8. The method of claim 1, wherein the method further comprises:
when the brake pedal effort is greater than a brake pedal effort threshold value, determining that the D-range set condition is satisfied, wherein the brake pedal effort threshold value is the D-range set condition of the brake pedal effort.

9. The method of claim 8, wherein the brake pedal effort threshold value is a predetermined value.

10. The method of claim 1, wherein entering the D-range idle slip state is delayed for a predetermined amount of time.

11. The method of claim 1, wherein the conditions for maintaining the D-range neutral control comprise:
a D-range idle state maintenance condition of the vehicle speed;
a D-range idle state maintenance condition of the engine coolant temperature; and
an auto hold entry restriction condition of the brake pedal effort,
wherein the D-range idle state maintenance condition and the auto hold entry restriction condition are selectively applied.

12. The method of claim 11, wherein:
when the vehicle speed is equal to an auto hold vehicle speed threshold value, determining that the D-range idle state maintenance condition is satisfied, wherein the auto hold vehicle speed threshold value is the D-range idle state maintenance condition of the vehicle speed; and
when the engine coolant temperature is higher than an auto hold engine coolant temperature threshold value, determining that the D-range state maintenance condition is satisfied, wherein the auto hold engine coolant temperature threshold value is the D-range idle state maintenance condition of the engine coolant temperature.

13. The method of claim 12, wherein the auto hold vehicle speed threshold value is a predetermined value, and the auto hold engine coolant temperature threshold value is a predetermined value.

14. The method of claim 11, wherein the method further comprises:
when the brake pedal effort is greater than an auto hold brake pedal effort threshold value, determining that the auto hold entry restriction condition is satisfied, wherein the auto hold brake pedal effort threshold value is the auto hold entry restriction condition of the brake pedal effort.

15. The method of claim 14, wherein the auto hold brake pedal effort threshold value is a predetermined value.

16. The method of claim 1, wherein the method further comprises:
when the D-range neutral control is not applied, applying, with the controller, a N-range neutral control in the neutral control state.

17. A vehicle comprising:
an engine configured to idle or turn off based on Idle Stop & Go (ISG) control and to enable a D-range idle state through an auto hold control;
a transmission configured to enter a D-range idle slip state through a D-range neutral control; and
a controller configured to:
receive signals as input data, wherein a sensor installed in the vehicle is configured to sense the signals;
apply threshold values when the engine is in an idle state, wherein the threshold values comprise a vehicle speed, an engine coolant temperature, and a brake pedal effort; and
apply the threshold values to operate the auto hold control that is configured to interrupt the D-range neutral control.

18. The vehicle of claim 17, wherein the vehicle further comprises:
a D-range neutral control map, wherein the D-range neutral control map is configured to perform the D-range neutral control in response to a D-range idle control signal; and an auto hold map, wherein the auto hold map is configured to perform the auto hold control in response to an auto hold control signal, wherein the controller is connected to the D-range neutral control map and the auto hold map.

19. The vehicle of claim 17, wherein the input data comprises:

P, N, D and R signals indicating a gear position;

a vehicle speed;

an engine coolant temperature;

a brake pedal effort signal; and

ISG ON/OFF signals.

\* \* \* \* \*